(12) United States Patent
Huhn et al.

(10) Patent No.: US 8,534,412 B2
(45) Date of Patent: Sep. 17, 2013

(54) MULTIPURPOSE UTILITY VEHICLE

(75) Inventors: Michael Carl Huhn, DeWitt, MI (US); Matthew Thomas Tipple, Wakeman, OH (US)

(73) Assignee: Custom Chassis, Inc., Wellington, OH (US)

( * ) Notice: Subject to any disclaimer, the term of this patent is extended or adjusted under 35 U.S.C. 154(b) by 119 days.

(21) Appl. No.: 12/682,142

(22) PCT Filed: Oct. 8, 2008

(86) PCT No.: PCT/US2008/011565
§ 371 (c)(1),
(2), (4) Date: Apr. 9, 2011

(87) PCT Pub. No.: WO2009/048561
PCT Pub. Date: Apr. 16, 2009

(65) Prior Publication Data
US 2011/0175336 A1 Jul. 21, 2011

Related U.S. Application Data

(60) Provisional application No. 60/997,786, filed on Oct. 8, 2007.

(51) Int. Cl.
*B62D 21/07* (2006.01)
*B62D 21/11* (2006.01)

(52) U.S. Cl.
USPC .................................. 180/312; 280/781

(58) Field of Classification Search
USPC ............. 180/89.1, 89.12, 311, 312; 280/781, 280/797
See application file for complete search history.

(56) References Cited

U.S. PATENT DOCUMENTS

| 32,199 | A | | 2/1900 | Worth |
|---|---|---|---|---|
| 1,864,644 | A | | 6/1932 | Eckland et al. |
| 2,417,019 | A | | 3/1947 | Sherman |
| 2,559,935 | A | * | 7/1951 | Theophilus ............ 280/124.113 |
| 2,732,902 | A | | 1/1956 | Barenyi |
| 3,685,853 | A | * | 8/1972 | Goldsmith .................. 280/81.1 |
| 3,690,395 | A | | 9/1972 | Spiller et al. |
| 3,786,889 | A | * | 1/1974 | Kelley .......................... 180/253 |
| 3,794,348 | A | * | 2/1974 | Fischer ......................... 280/784 |
| 3,921,742 | A | | 11/1975 | May et al. |
| 4,121,680 | A | * | 10/1978 | van der Lely ................... 180/24 |

(Continued)

FOREIGN PATENT DOCUMENTS

EP 0 905 008 A2 3/1999
JP 2007-106320 4/2007

OTHER PUBLICATIONS

Brochure, Vredo VT2516.

*Primary Examiner* — Drew Brown
(74) *Attorney, Agent, or Firm* — Clark & Brody

(57) ABSTRACT

A multiuse vehicle comprises a frame having longitudinal portions forming a central opening for supporting an engine and end portions extending forward and rearward from said longitudinal portions, each of the end portions having a downwardly extending leg portion with one or more hitches. A suspension system includes the use of pivoting arms that carry trunnion-mounted differentials. An operator's cab is mounted on a forward portion of the frame to provide the operator with increased visibility. The frame behind the operator's cab is configured to receive any of a variety of devices such as a dump bed, a sprayer tank, a salt spreader, or a flat bed.

16 Claims, 6 Drawing Sheets

(56) References Cited

U.S. PATENT DOCUMENTS

| | | | |
|---|---|---|---|
| 4,131,170 A * | 12/1978 | van der Lely | 180/22 |
| 4,140,281 A | 2/1979 | Fulghum, Jr. et al. | |
| 4,164,985 A | 8/1979 | Bobard | |
| 4,355,696 A | 10/1982 | Moll | |
| 4,611,683 A | 9/1986 | Hilmer | |
| 4,662,647 A | 5/1987 | Calvert | |
| 4,708,572 A | 11/1987 | Kolker | |
| 4,754,826 A * | 7/1988 | van der Lely | 180/24 |
| 4,804,205 A | 2/1989 | Parsons | |
| 4,805,720 A | 2/1989 | Clenet | |
| 5,033,567 A | 7/1991 | Washburn et al. | |
| 5,163,700 A | 11/1992 | Loeber | |
| 5,283,415 A | 2/1994 | Nishi et al. | |
| 5,379,842 A | 1/1995 | Terry | |
| 5,618,156 A | 4/1997 | Brown | |
| 5,701,969 A | 12/1997 | Stephen | |
| 5,944,130 A | 8/1999 | Sewell | |
| 6,250,658 B1 | 6/2001 | Sakai | |
| 6,588,189 B2 * | 7/2003 | Horejsi et al. | 56/28 |
| 6,598,891 B2 | 7/2003 | Sakai | |
| 6,729,431 B2 * | 5/2004 | Osuga et al. | 180/312 |
| 6,871,875 B2 * | 3/2005 | Grimm et al. | 280/785 |
| 6,929,083 B2 * | 8/2005 | Hurlburt | 180/208 |
| 7,036,622 B2 * | 5/2006 | Iwaki | 180/311 |
| 7,228,931 B2 * | 6/2007 | Ricke et al. | 180/215 |
| D555,548 S | 11/2007 | Nelson et al. | |
| 7,510,198 B2 * | 3/2009 | Rach et al. | 280/124.112 |
| 7,644,942 B2 * | 1/2010 | Bordini et al. | 280/124.112 |
| 7,735,594 B2 * | 6/2010 | Hidaka | 180/312 |
| 7,757,805 B2 * | 7/2010 | Wakuta et al. | 180/312 |
| 7,775,556 B2 * | 8/2010 | Sakamoto et al. | 280/781 |
| 2002/0089162 A1 | 7/2002 | Horejsi et al. | |
| 2002/0163173 A1 | 11/2002 | Ruehl et al. | |
| 2003/0070861 A1 * | 4/2003 | Dahl et al. | 180/312 |
| 2007/0071587 A1 | 3/2007 | Baumann et al. | |
| 2009/0071739 A1 * | 3/2009 | Leonard et al. | 180/209 |

* cited by examiner

MULTIPURPOSE UTILITY VEHICLE

This application is the national stage of International Application Number PCT/US2008/011565, filed Oct. 8, 2008, which was published in English, and claims priority of U.S. Provisional Application No. 60/997,786, filed February Oct. 8, 2007.

TECHNICAL FIELD

This invention relates to the art of vehicles and, in particular, to a configuration for a vehicle that may be used for a variety of purposes.

BACKGROUND ART

Vehicles used for farming or industrial uses are well known. These vehicles typically include a frame, an engine, a transmission, axles, an operator cab, and, optionally, utility structure such as a dump bed, a sprayer, or the like. While vehicles having such components are known, prior vehicles do not have adequate flexibility and are typically single use vehicles. For example, in a known farm tractor configuration the engine is placed toward the front of the vehicle while the operator cab is placed toward the rear. This configuration greatly restricts visibility of the front of the tractor. Moreover, the frame of such a vehicle is typically configured to engage an object to be towed, such as a trailer, only from the rear, which restricts its use. Such vehicles are not capable of being used for a variety of purposes.

Vehicles configured to place the operator cab toward the front are known, but these typically place the engine beneath the cab, which restricts the uses that can be made of the frame in the area beneath the cab.

SUMMARY OF THE INVENTION

In a preferred embodiment, the invention is a vehicle providing a unique combination of a forward mounted, mid-mounted drive train, and axle suspension system to create a multi-application work vehicle with excellent visibility and utility. For example, the vehicle of the invention can be used for agricultural, construction or municipal applications.

The operator's cab of the preferred vehicle has windows extending over the majority of the height of the cab and in one embodiment over virtually the entire height of the cab. The cab is mounted to the frame over the front axle by rubber mounts and provides excellent visibility of the area in front of the vehicle. The Cab may be tilted forward to provide access to the frame and front axle for maintenance.

The preferred frame comprises a box design in cross section forming a frame extending from the front to the rear of the vehicle and with integral legs extending downward at each end of the frame to provide at each end a three-point hitch, a power take-off, and a tongue hitch. The frame is narrowed at each end to provide space for the vehicle wheels, while the central portion of the frame is wider and provides a central opening to receive the engine and transmission. In one embodiment, the frame comprises upper and lower steel plates with cutouts to provide the central opening and the narrowed portions. Steel plates forming the sides of the box design are bent to match the perimeter of the upper and lower steel plates and secured, as by welding, vertically between the upper and lower plates.

The engine and transmission are mounted in the frame opening in the mid section of the frame to evenly distribute the weight of these components and to provide a low center of gravity. The frame is preferably internally reinforced whereby it is rigid to reduce fatigue cracking of the equipment attached to the frame.

The narrower front and back portions of the frame provide clearance for the wheels during steering of the vehicle but also maintain a legal overall road width for the vehicle.

A suspension system for front and rear differentials comprises front and back arms pivotally mounted for movement about respective transverse axes. A differential is mounted to each arm by a trunnion pivot, and one of the differentials is allowed to pivot on the trunnion about a longitudinal axis. Stops are provided on the arms to control the amount of rotation of a differential on the trunnions, and a selected one of the differentials is typically prevented from pivoting on the trunnion by the stops. The choice of which differential is allowed to pivot on the trunnion and the amount depends on the application.

Hydraulic cylinders are provided between the movable ends of the arms and the frame to support the weight of the vehicle and to dampen oscillations. Electronic height sensors are also provided to detect the position of the arms and to provide that information electronically to a controller to raise or lower the suspension to maintain a desired vehicle height.

DETAILED DESCRIPTION OF THE PREFERRED EMBODIMENTS

Figure 1:
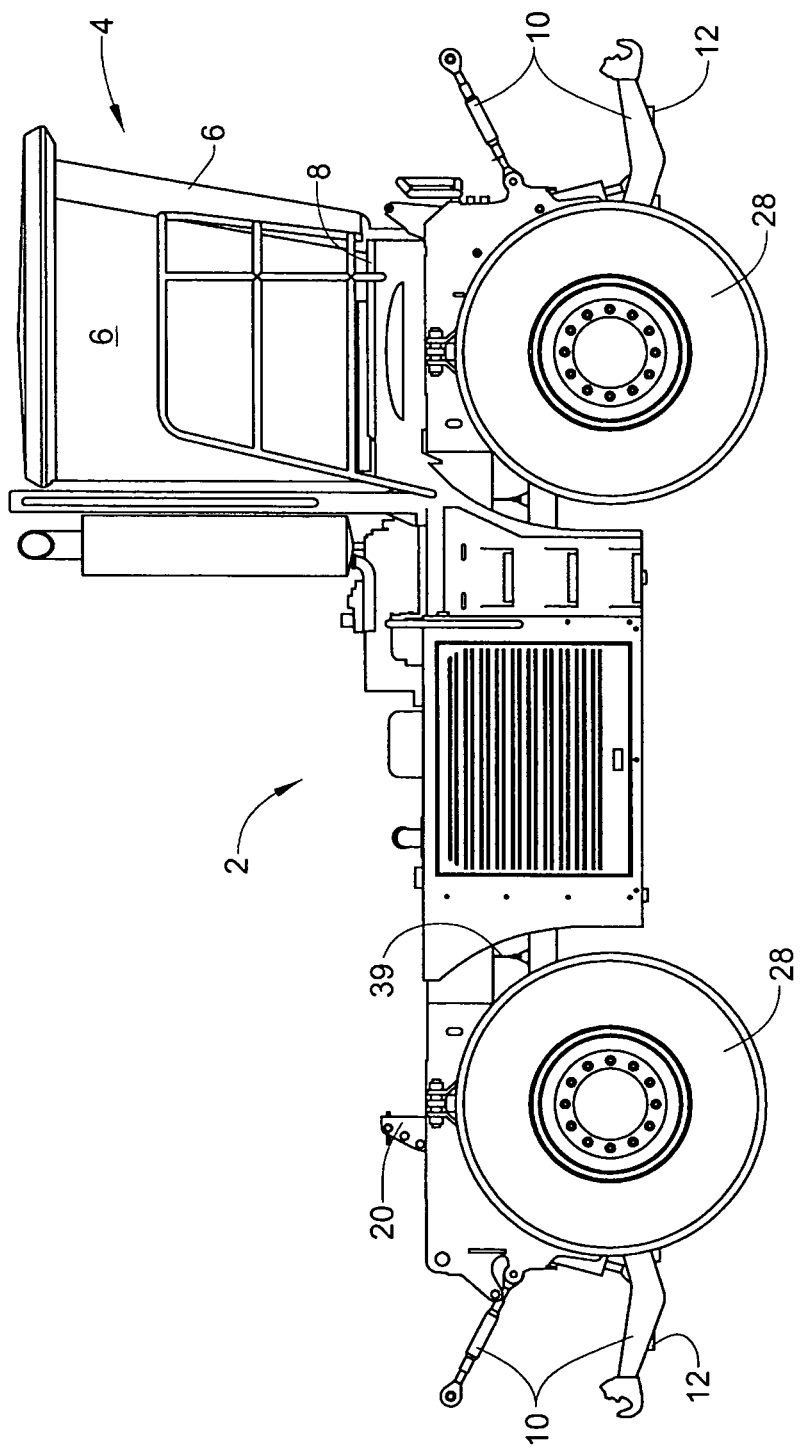
FIG. 1 is a right side view of a preferred embodiment of a vehicle in accordance with the invention.

With reference to FIG. 1, a vehicle 2 in accordance with the invention comprises an operator's cab portion 4 that is mounted toward one end of a frame, which will be more described in more detail below. The cab 4 preferably provides windows 6 that extend essentially the full height of the cab to form an enclosure for the operator while providing increased visibility for the operator.

Platforms 8 are located on either side of the cab 4 and provide walkways for the operator and for technicians performing maintenance on the frame or engine when the cab is pivoted clockwise when viewed from FIG. 1 (not illustrated). A three-point hitch 10 and a tongue hitch 12 are attached to each end of the frame whereby the vehicle may be used to tow other vehicles, trailers, etc. from either end of the vehicle.

Figure 2:
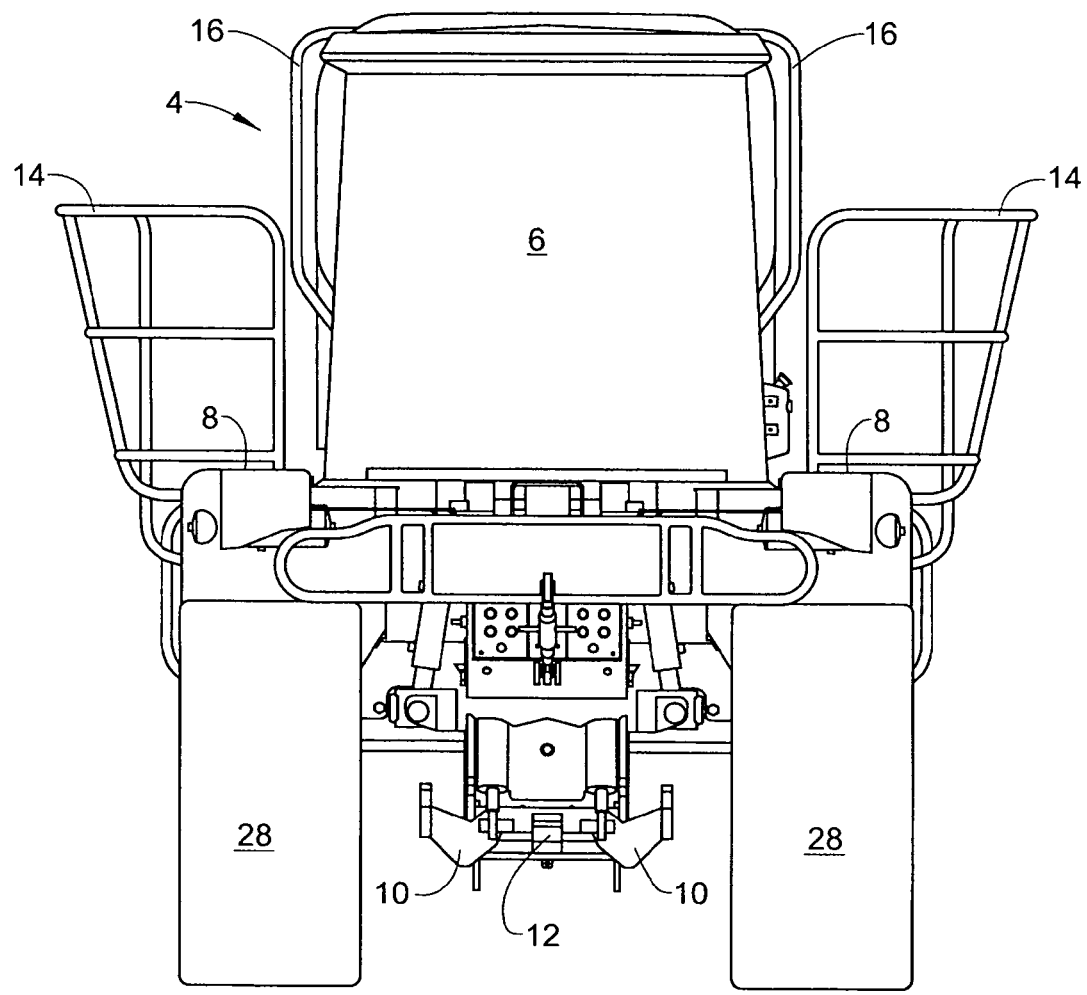
FIG. 2 is a front view of the vehicle of FIG. 1.

FIG. 2 shows the side rails 14 and hand rails 16, which provide safety for the operator when entering or exiting the cab.

Figure 3:
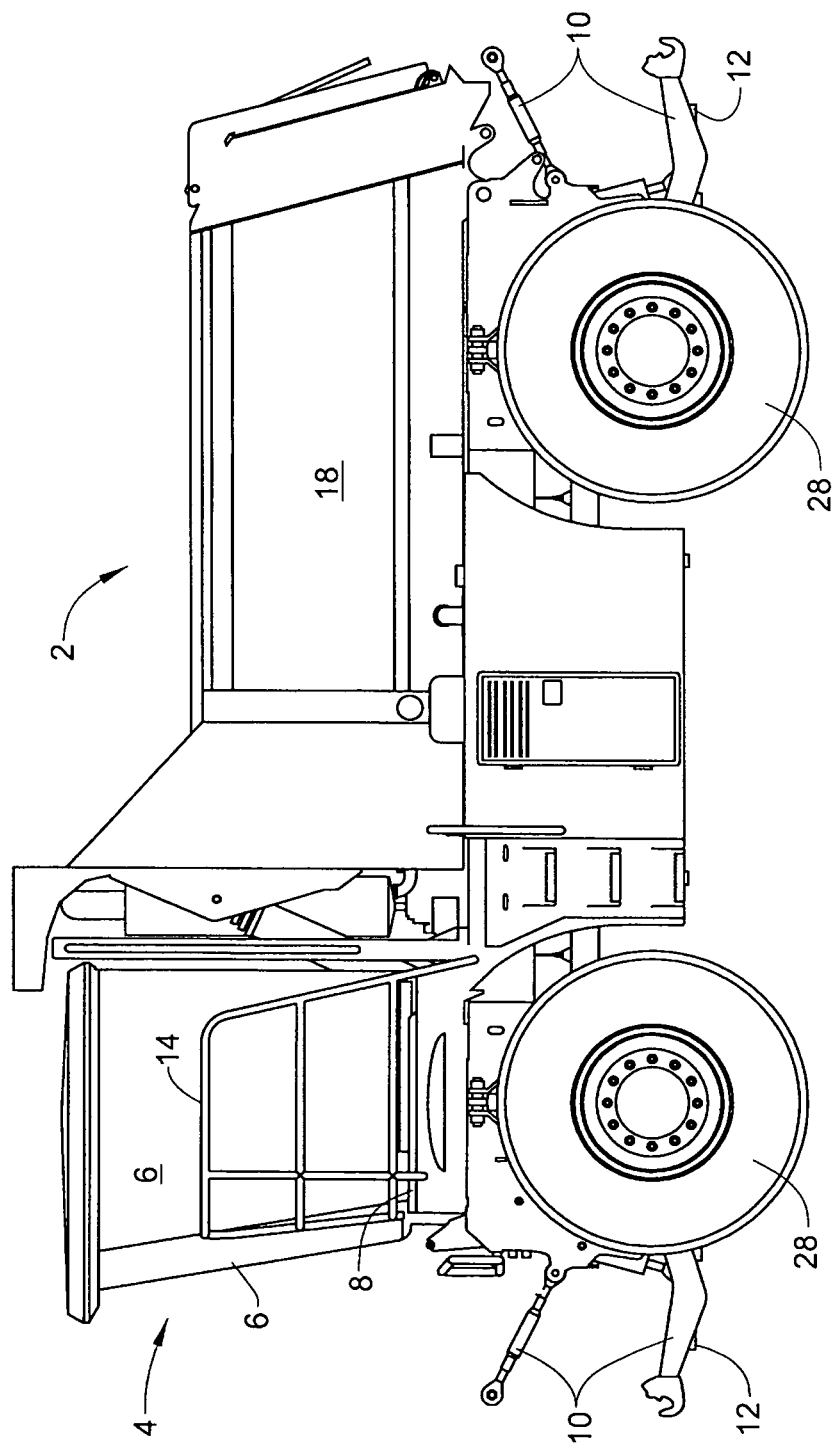
FIG. 3 is left side view of the vehicle of FIG. 1 with a dump bed attached.

FIG. 3 shows the vehicle 2 of FIG. 1 with a dump bed 18 mounted thereon. It will be appreciated from FIG. 1 that the cab-forward configuration allows the portion of the vehicle that is behind the cab to be used for a variety of purposes. In accordance with one feature of the invention, the portion behind the cab 4 includes structure such as that illustrated at 20 for detachably mounting items such as the dump bed 18. The structure contemplated by the invention allows the interchange of a variety of devices for different applications, including for example, a dump bed, a sprayer tank, a salt spreader, a flat bed, and the like.

Figure 4:
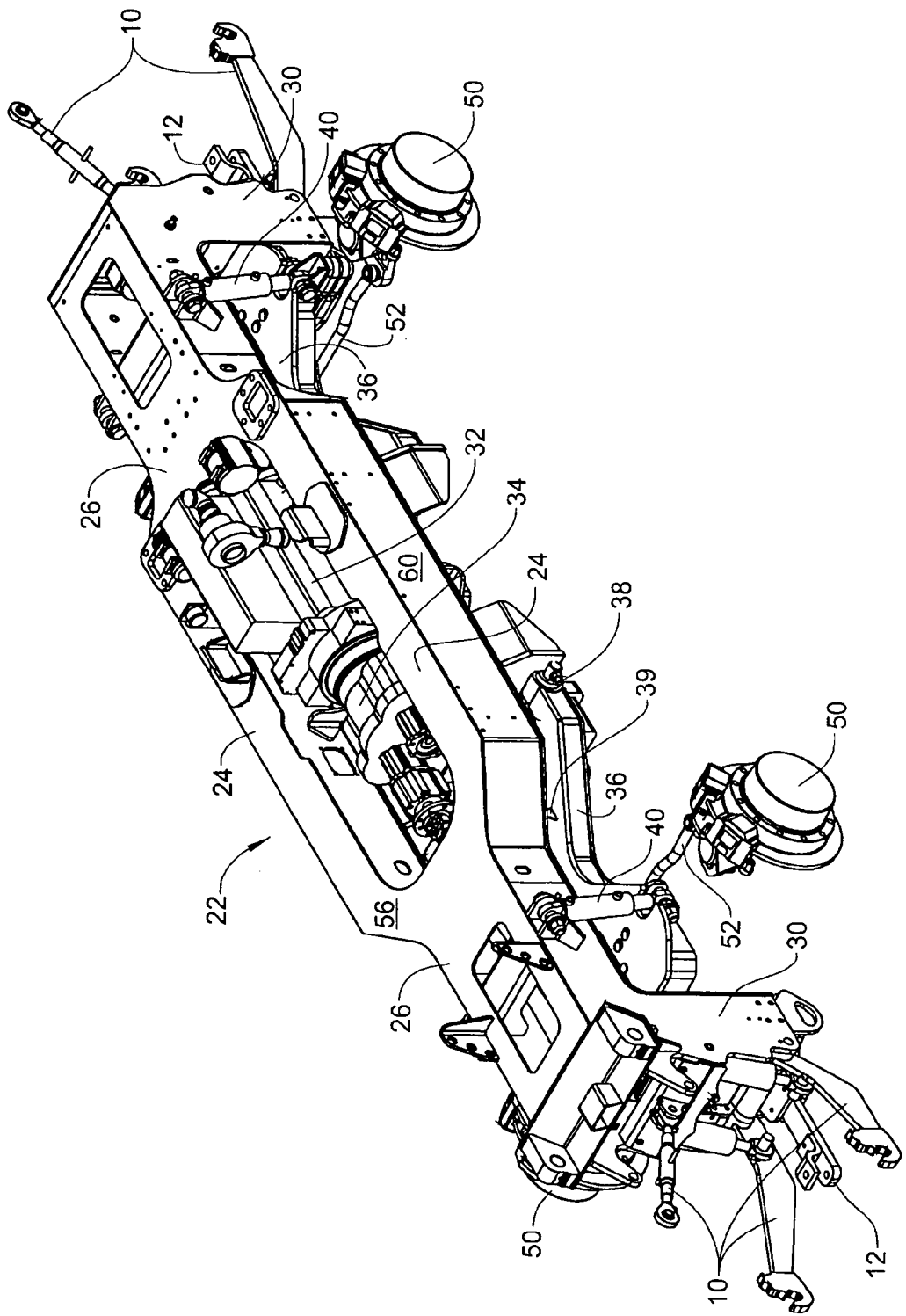
FIG. 4 is a top perspective of the frame of the vehicle of FIG. 1.
Figure 5:
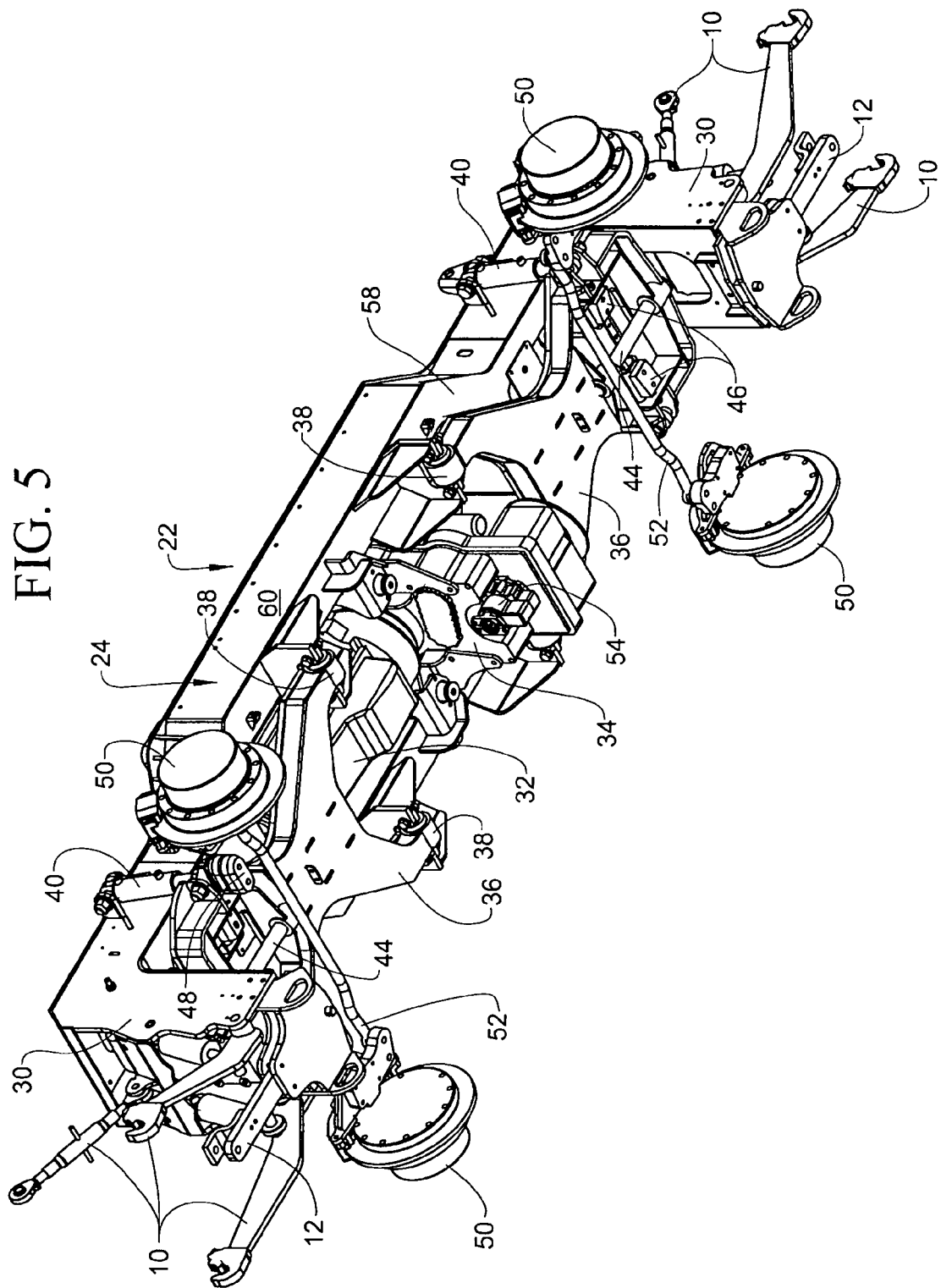
FIG. 5 is a bottom perspective view of the frame of FIG. 4.

The unique frame of the vehicle according to the invention is shown in FIGS. 4 and 5. The frame 22 extends substantially the length of the vehicle to support the operator's cab and any utility attachment, such as the dump bed shown in FIG. 3.

The frame is configured to include a central portion formed by two longitudinally extending elements 24 that are connected by end elements 26. The end elements 26 are much narrower than the central portion to allow clearance for the wheels during turning. A leg 30 depends from each of the end elements 26 and provides mounting structure for the three-point hitch 10 and the tongue hitch 12.

The central portion of the frame is configured to allow an engine, such as an internal combustion engine 32, or other source of power, and a transmission 34 to be mounted on central part of the frame. This arrangement has been found advantageous because it provides weight balance and contributes to lowering the center of gravity of the vehicle. Moreover, mounting the engine centrally as shown allows a leg 30 to be provided at both ends of the frame. The leg located at the front of the vehicle is particularly useful in this configuration because the cab is located at the front of the vehicle, and the operator can easily see the vehicle, trailer, or other object to which the hitch is to be attached during the connection process.

The engine 32 is preferably mounted by known means, such as rubber mounts and the like. A radiator for the engine may be placed at the side of the vehicle or at any other convenient place and mounted in a horizontal or vertical orientation.

Figure 6:
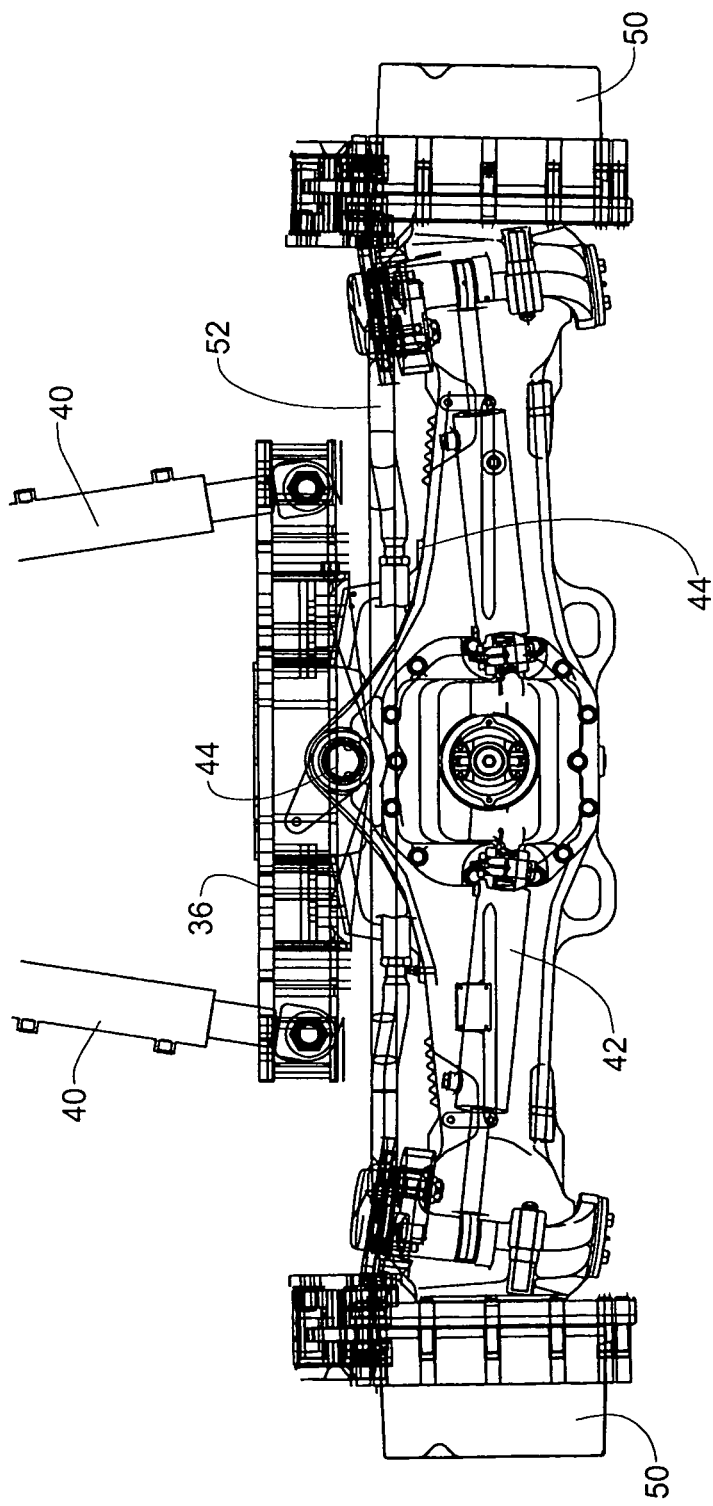
FIG. 6 is a rear view of a pivoting arm of the frame of FIG. 4 showing a differential mounted thereon.

FIGS. 4, 5, and 6 show the preferred structure for mounting the axles and differentials that drive the wheels 28. An arm 36 is mounted at each end of the central portion of the frame for pivotal motion about a transverse axis. In the embodiment illustrated, the arm is mounted by a transversely positioned rod that engages a similarly oriented sleeve on the arm carrying a dampening element made of urethane, rubber, or like materials, as collectively illustrated at 38. The arms 36 are supported at their free ends by suspension elements 40 that provide shock absorbing features as well as weight-bearing features, such as coils springs or other resilient elements such as hydraulic elements. Thus, the weight of the vehicle is transferred through the suspension elements 40 and mounts 38 to the wheels. The pivotal motions of the arms 36 absorb forces arising from uneven terrain, and the height of the vehicle is determined by the rest positions of the arms 36. A height detector 39 is provided between the arm and the end of the frame 26 to detect the height of the vehicle and to allow adjustment of the height. Also, one or more of the suspension elements 40 may also be provided with a length sensor, or such a sensor may be separately provided as at 39. Also, the suspension elements 40 may be of the type that are capable of adjustment, as by hydraulic adjustment, whereby the strength of the weight bearing feature may be varied by the operator, preferably remotely, to adjust the height of the vehicle.

Axles for carrying the wheels 28 are mounted to the arms 36. In the preferred embodiment, the axles comprise trunnion-mounted differentials, as illustrated in FIG. 6. A differential 42 is mounted to a trunnion 44 that is connected to an arm 36. The trunnion mount allows the differential 42 to oscillate about the longitudinal axis defined by the trunnion 44 to accommodate variations in the terrain contacted by the wheels 28. Because only one of the differentials is required to oscillate, in the preferred embodiment differential stops 46 are provided on the arm at the rear of the vehicle to prevent oscillations of the rear differential. In this embodiment, the arm at the front of the vehicle is provided with resilient differential stops 48 that allow oscillation but also tend to retain the horizontal orientation of the vehicle.

It will be appreciated that the differential 42, itself, is of a type that is known in the art and includes hubs 50 on which the wheels are mounted and tie rods 52 that control the orientation of the hubs and wheels. The orientation of the hubs is controlled by a steering mechanism, which is not illustrated, such that the hubs turn together or turn separately to provide four-wheel steering.

The differentials are driven by respective drive shafts, not shown, which are connected between a respective one of the outputs of the transmission, one of which is shown at 54. As well, power take-off shafts may be provided to supply power to winches or other equipment positioned on one of the legs 30.

The frame elements 24 and 26 are preferably formed by an upper sheet 56 and a lower sheet 58 that are preferably of steel and cut to provide the desired shape, such as that shown in FIGS. 4 and 5. The sheets are attached to each other by vertical sheets 60 that are preferably welded to the upper and lower sheets but which may be secured to them by any of a variety of techniques, including bolting. This construction forms a strong box-like structure that resists twisting to maintain the integrity of the devices mounted to the frame.

Modifications of the invention within the scope of the appended claims will be apparent to those of skill in the art.

We claim:

1. A frame for a vehicle comprising a longitudinally central portion with first and second longitudinal elements extending substantially parallel to a longitudinal axis and laterally adjacent each other,
    a first end element connected to a first end of said central portion and a second end element connected to an opposite end of said central portion, said first and second longitudinal elements being laterally spaced from each other to provide an opening for receiving an engine and transmission, said first and second end elements being aligned with each other and extending along a longitudinal axis in opposed directions away from said central portion, at least one of said end elements comprising a leg adapted to mount auxiliary equipment and extending in a downward direction transverse to said longitudinal axis,
    first and second arms, each of which is mounted at one end to said frame for pivotal motion about a respective horizontal axis transverse to said longitudinal axis and adapted to receive an axle at a free end opposite said one end, and
    suspension elements extending between each of said arms and said longitudinal or end elements,
    wherein said first and second longitudinal portions and said end portions are formed by an upper steel sheet, a lower steel sheet, and vertical sheets secured to said upper and lower sheets such that said frame has a box-shape in cross section and provides rigidity to said frame.

2. A frame according to claim 1 wherein at least one of said arms includes a trunnion for receiving a trunnion-mounted axle.

3. A frame according to claim 1 wherein each of said arms includes a trunnion for receiving a trunnion-mounted axle.

4. A frame vehicle according to claim 3 wherein one of said axles is mounted for oscillation about said trunnion.

5. A frame according to claim 4 further comprising stops that prevent oscillation about said trunnion of the other of said differentials.

6. A frame vehicle according to claim 1 further comprising at least one hitch mounted on said downwardly extending leg.

7. A frame according to claim 1 in combination with an operator's cab mounted to said frame at one end thereof.

8. A combination according to claim 7 wherein said operator's cab includes an enclosure and walkways adjacent said enclosure for facilitating entry or exit of an operator.

9. A combination according to claim 8 wherein the frame is adapted to removably receive a demountable apparatus behind said operator's cab.

10. A combination according to claim 9 wherein said demountable apparatus comprises any of a dump bed, a sprayer tank, a salt spreader, or a flat bed.

11. A frame according to claim 1 comprising first and second said legs, each of said legs extending from a respective one of said first and second end elements, wherein said one end of each of said first and second arms is mounted to said frame such that each free end lies between a respective one end and a respective said leg.

12. A frame according to claim 11 wherein said first and second end elements, said first and second legs, and said first and second arms are arranged to be symmetrical with respect to a central transverse plane of said frame.

13. A frame according to claim 1 wherein the horizontal transverse dimension of said central portion is larger than the horizontal transverse dimension of said first end element and of said second end element.

14. A frame for a vehicle comprising a longitudinally central portion with first and second longitudinal elements extending substantially parallel to a longitudinal axis and laterally adjacent each other, a first end element connected to a first end of said central portion and a second end element connected to an opposite end of said central portion, said first and second longitudinal elements being laterally spaced from each other to provide an opening for receiving an engine and transmission, said first and second end elements being aligned with each other and extending along a longitudinal axis in opposed directions away from said central portion, at least one of said end elements comprising a leg adapted to mount auxiliary equipment and extending in a downward direction transverse to said longitudinal axis, wherein said central portion and said first and second end portions are constructed to provide torsional rigidity to said frame, and first and second arms, each of which is mounted at one end to said central portion or an end portion for pivotal motion about only a respective horizontal axis transverse to said longitudinal axis and adapted to receive an axle at a free end opposite said one end.

15. A frame according to claim 14 wherein said first and second end elements are transversely narrower than said central portion.

16. A frame according to claim 14 further comprising suspension elements extending between each of said arms and said central or end elements.

* * * * *